US009247620B2

(12) United States Patent
Gritti et al.

(10) Patent No.: US 9,247,620 B2
(45) Date of Patent: Jan. 26, 2016

(54) CONTROLLING LIGHT SOURCE(S) VIA A PORTABLE DEVICE

(71) Applicant: KONINKLIJKE PHILIPS N.V., Eindhoven (NL)

(72) Inventors: Tommaso Gritti, Breda (NL); Lorenzo Feri, Eindhoven (NL); Stephanus Joseph Johannes Nijssen, Eindhoven (NL); Frederik Jan De Bruijn, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/424,542

(22) PCT Filed: Aug. 8, 2013

(86) PCT No.: PCT/IB2013/056494

§ 371 (c)(1),
(2) Date: Feb. 27, 2015

(87) PCT Pub. No.: WO2014/033571

PCT Pub. Date: Mar. 6, 2014

(65) Prior Publication Data

US 2015/0230320 A1 Aug. 13, 2015

Related U.S. Application Data

(60) Provisional application No. 61/695,079, filed on Aug. 30, 2012.

(30) Foreign Application Priority Data

Aug. 30, 2012 (EP) .................................... 12182387

(51) Int. Cl.
*G08B 13/08* (2006.01)
*G09B 21/00* (2006.01)
(Continued)

(52) U.S. Cl.
CPC ............ *H05B 37/0272* (2013.01); *G08C 17/02* (2013.01); *G08C 23/04* (2013.01);
(Continued)

(58) Field of Classification Search
None
See application file for complete search history.

(56) References Cited

U.S. PATENT DOCUMENTS 6,710,763 B1 * 3/2004 Iinuma .................... G09G 5/10 315/169.3
2007/0229250 A1 * 10/2007 Recker .................... G08B 5/36 340/531

(Continued)

FOREIGN PATENT DOCUMENTS

WO 03077087 A2 9/2003
WO 2008001262 A1 1/2008

*Primary Examiner* — Jennifer Mehmood
*Assistant Examiner* — Pameshanand Mahase
(74) *Attorney, Agent, or Firm* — Meenakshy Chakravorty

(57) ABSTRACT

A method of controlling a light source (105) via a handheld computing device (110) is disclosed. The method comprises receiving an input produced by one or more sensors of the handheld computing device, the input being indicative of a current orientation of the handheld computing device. The method further comprises determining, based at least in part on the input, that the handheld computing device is in a predefined triggering orientation, e.g. in a generally horizontal orientation. In response to so determining, one or more frames of image data are acquired via an image sensor connected to the handheld computing device (110). The method further comprises obtaining an identifier of the light source, e.g. from information encoded into light emitted by the light source (105), having determined that the one or more frames of image data comprise image data representative of the light source (105). The method further comprises transmitting to the light source (105) a command indicative of a desired light setting for the light source (105), which desired light setting may for example have been provided via user input or may be a predefined setting retrieved from memory. A handheld computing device (110) and a lighting system (100) are also disclosed.

15 Claims, 4 Drawing Sheets

(51) Int. Cl.

| | |
|---|---|
| ***H04Q 1/30*** | (2006.01) |
| ***G08B 29/00*** | (2006.01) |
| ***H05B 37/04*** | (2006.01) |
| ***H05B 37/02*** | (2006.01) |
| ***H05B 39/04*** | (2006.01) |
| ***H04N 9/64*** | (2006.01) |
| ***G08C 17/02*** | (2006.01) |
| ***G08C 23/04*** | (2006.01) |

(52) U.S. Cl.

CPC ......... *H05B 37/029* (2013.01); *H05B 37/0245* (2013.01); *G08C 2201/32* (2013.01); *G08C 2201/70* (2013.01); *G08C 2201/93* (2013.01)

(56) References Cited

U.S. PATENT DOCUMENTS

| | | | | |
|---|---|---|---|---|
| 2010/0264846 | A1* | 10/2010 | Chemel ................ | H05B 37/029 315/294 |
| 2011/0169413 | A1 | 7/2011 | Wendt et al. | |
| 2011/0260652 | A1* | 10/2011 | Hsieh ................... | H05B 37/029 315/312 |
| 2011/0285526 | A1* | 11/2011 | Tanaka ............... | H05B 33/0884 340/514 |

* cited by examiner

CONTROLLING LIGHT SOURCE(S) VIA A PORTABLE DEVICE

CROSS-REFERENCE TO PRIOR APPLICATIONS

This application is the U.S. National Phase application under 35 U.S.C. §371 of International Application No. PCT/IB2013/056494, filed on Aug. 8, 2013 which claims the benefit of U.S. Provisional Patent Application No. 61/695,079 and European Patent Application No. 12182387.6, both of which filed on Aug. 30, 2012. These applications are hereby incorporated by reference herein.

FIELD OF THE INVENTION

The invention relates generally to lighting control, and more specifically to controlling one or more light sources via a portable device.

BACKGROUND OF THE INVENTION

Some lighting systems permit one or more light sources thereof to be controlled via a handheld wireless controller.

Typically, a small group of light sources (e.g. the light sources in a workspace) will have a dedicated controller, which is configured to communicate with those light sources only. A person wishing to vary the light settings of one or more of the light sources must first locate the controller, and then determine how to use it. A user may consider it more convenient to control the light settings using his or her personal handheld computing device, e.g. smartphone or tablet computer.

The applicant's co-pending patent application, no. PCT/IB2012/051370, discloses a handheld computing device which is configured to use its image sensor to record variations in the light emitted by a light source, and then to derive information from the recorded variations. The information may include an identifier of the light source, such as a MAC address and/or IP address. It is envisaged that such a device could, once it has received the MAC address and/or IP address of a light source, be used to communicate with and thereby control the light source e.g. via WiFi or Zigbee. The device would require the user to determine when to activate the image sensor, and to position and orient the device such that the image sensor is able to record the variations in the emitted light. For example, the user would be required to 'take a picture' of the light sources which are to be controlled. This might be suitable for specialist applications such as commissioning lighting systems, but non-specialist users may consider it to be inconvenient.

SUMMARY OF THE INVENTION

An object of the invention is to enable a handheld computing device, which is capable of controlling a light source, to automatically detect light sources it can potentially control. One approach to achieve this would be to adapt the device mentioned above to continually acquire data via its image sensor, and continually process the data to detect light sources. But that approach would cause significant drain on the battery of the device. A better solution is desirable.

One aspect of the invention provides a method of controlling a light source via a handheld computing device, as recited in claim 1.

For example, a user can place a device enabled to carry out the method of claim 1 on a work surface, such that it will be in a predefined triggering orientation. The device is configured to automatically determine that it is in a predefined triggering orientation, and in response acquire image data and determine whether there are any light sources within the field of view of the image sensor. Thus, for example, when the user arrives at work and places the device on his or her desk, the device will automatically detect whether there are any light sources that it can potentially control. By automatically acquiring image data only when the device is in the predefined triggering orientation, drain on the battery is reduced compared with the approach noted above. And for many users, the act of placing the device on his or her respective desk is a routine behavior, so the method of claim 1 may fit unobtrusively into their normal routines.

In an embodiment, a generally horizontal orientation is the predefined triggering orientation, or is one of a plurality of predefined triggering orientations. The device is considered to be in a 'generally horizontal' orientation if it is parallel to a horizontal plane, +/−5 degrees.

An identifier of the light source may be obtained from one or more variations in the light emitted thereby, as captured in the image data, as recited in claim 2. Thus in an embodiment a handheld computing device can directly obtain a light source's identity from the light emitted thereby, without having to e.g. carry out a device discovery method to determine the identity of the light source.

Optionally, the desired light setting(s) is/are predefined by a user and stored in a location accessible by the device. In an embodiment, the user's preferred light setting(s) can be retrieved and applied to the light source automatically by the device. For instance, it may be that the user places the device on his or her desk and then it automatically adjusts the relevant light sources to the user's preferred settings.

Additionally or alternatively, the device may be enabled to present a user interface in accordance with claim 4. In an embodiment, a touch-sensitive device comprises the display and the input device.

Optionally, the user interface comprises at least part of an acquired frame of image data, as recited in claim 5.

Optionally, the method comprises receiving an additional input produced by one or more sensors of the device, as recited in claim 6. In an embodiment, the device is enabled to prevent the camera from acquiring said one or more frames of image data in response to determining that movement of the device is above a threshold. A suitable value for the threshold can be obtained via calibration, and is believed to be device-specific. A suitable preset value, which may not need further calibration, may be a value representing a change in acceleration of 1 $m/s^2$ (in any direction). For a gyroscope, this might be something of the order of 2pi/1000 radians/s.

Optionally, the method comprises receiving a further input produced by one or more sensors of the device, as recited in claim 7.

Optionally, the method involves determining that the camera is pointing generally upwards, as recited in claim 8. In an embodiment wherein the device has one integrated camera, the device may be enabled to prevent the integrated camera from acquiring said one or more frames of image data in response to determining that the integrated camera is pointing generally downwards. In an embodiment wherein the device has two integrated cameras, the device may be enabled to use the integrated camera that is pointing generally upwards, and not the one that is pointing generally downwards.

In another aspect, the invention provides a computer readable medium comprising computer-interpretable instructions, as recited in claim 10.

In another aspect, the invention provides a handheld computing device as recited in claims 11, with optional features as recited in claims 12 to 14.

In another aspect, the invention provides a lighting system as recited in claim 15.

These and other aspects of the invention will be apparent from and elucidated with reference to the embodiments described below.

BRIEF DESCRIPTION OF THE DRAWINGS

Specific embodiments of the invention will be described, by way of example only, with reference to the accompanying drawings in which.

DETAILED DESCRIPTION OF EMBODIMENTS

Figure 1:
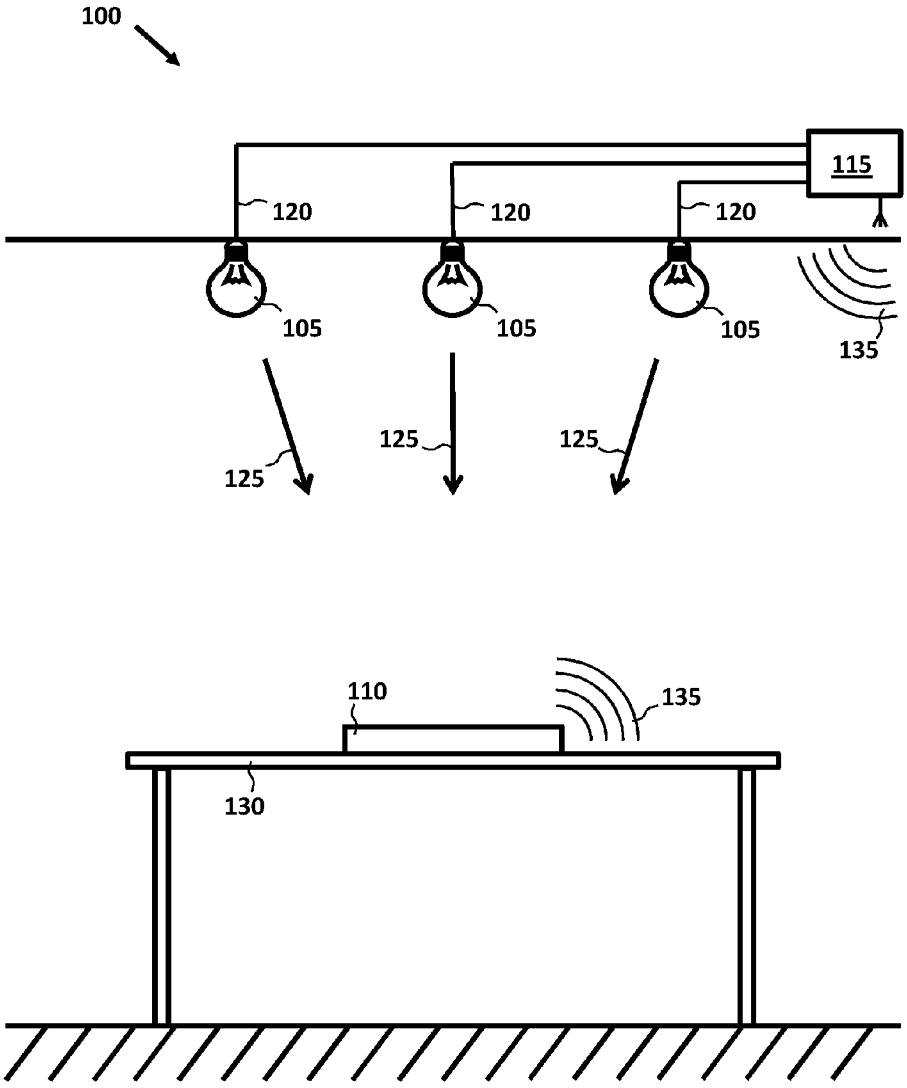
FIG. 1 schematically shows a lighting system comprising a handheld computing device in accordance with an embodiment of the invention.

In overview, and with reference to FIG. 1, in an embodiment of the invention a lighting system 100 comprises a plurality of light sources 105 and a handheld computing device 110 (hereinafter, the "portable controller 110") suitable for controlling the light sources. The lighting system 100 also comprises a wireless access point 115 (hereinafter, the "WAP 115").

The light sources 105 are ceiling-mounted and emit light 125 generally downwards. They are connected to the WAP 115 via a wired channel 120, which in this case comprises respective Ethernet cables.

The portable controller 110 is shown in FIG. 1 to be positioned in a horizontal orientation on the upper surface of a desk 130. The desk 130 is positioned in a workspace beneath the light sources 105. The light 125 emitted downwards by the light sources 105 is incident on the desk, and therefore on the portable controller 110.

Each light source 105 encodes its IP address (and/or MAC address, or alterative encoding allowing to uniquely identify each lamp in the network), via intensity variations, into the light 125 it emits. The portable controller 110 is arranged to receive the light 125 and determine the IP address encoded in it, as will be described in more detail below. Incorporating a respective spread spectrum modulator (not shown) in each of the light sources 105 is one way to efficiently realize the modulation. In this embodiment, a Code Division Multiple Access (CDMA) coding scheme is used to encode the different IP addresses (and/or MAC addresses). The CDMA coding scheme is based on On-Off Keying, which represents digital data as the presence or absence of a carrier wave, and is described in detail in International Patent Application Publication No. WO 2008/001262 . It will be appreciated, however, that in principle any suitable encoding scheme may be used. For instance, a generalization of BiPhase (BP) modulation may be used.

The portable controller 110 can communicate with the WAP 115 via a wireless channel 135, which is a WiFi channel in this embodiment. Thus the portable controller 110 can communicate with each of the light sources 105 individually via the WAP 115 using the IP addresses (and/or MAC address) that it determined from the light 125 it received.

Figure 2:
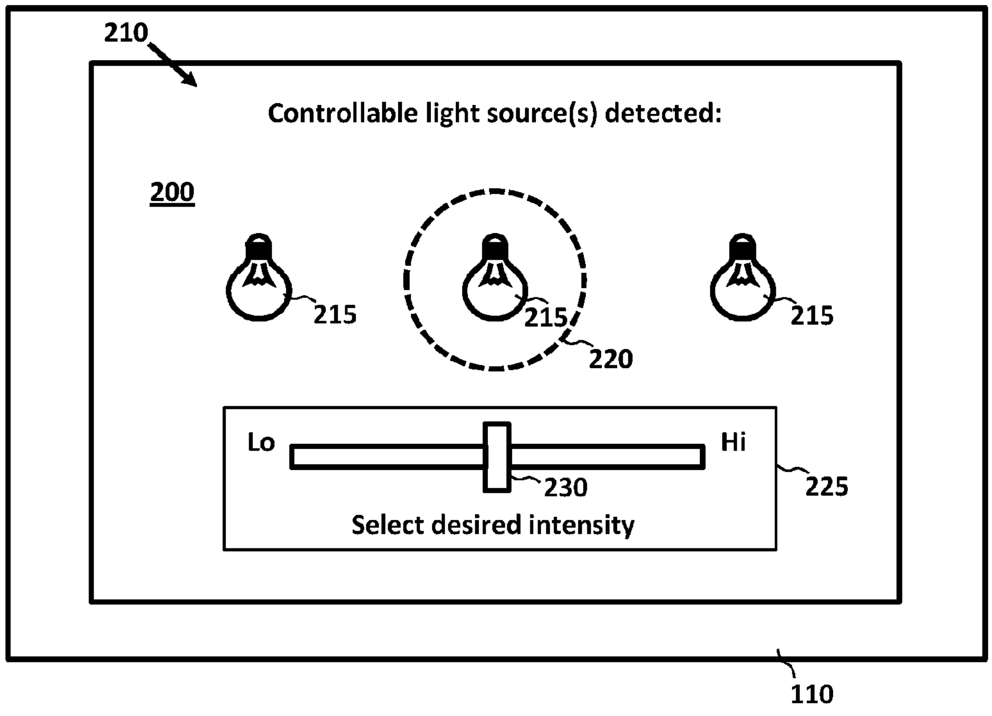
FIG. 2 schematically shows a screen shot of the handheld computing device of FIG. 1, which contains a user interface for controlling light sources.

Still in overview, and now with reference to FIG. 2, the portable controller 110 is arranged to present on a display 200 thereof a user interface 210 for controlling the light sources 105. The display 200 in this embodiment is a touch-screen display device of the general type found in some modern portable computing devices, such as smartphones and tablet computers.

The user interface 210 comprises a representation 215 of the light sources 105, which in this embodiment comprises a respective icon for each of the light sources 105, shown as light bulb icons in FIG. 2.

A user can select which light source 105 to control by touching the display 200 where the representation 215 of that light source 105 is shown. The user interface 210 shows an indication 220 of which light source 105 has been selected. In this embodiment the indication 220 is an icon overlay, shown in FIG. 2 as a dashed line encircling the icon 215 corresponding to the selected light source 105.

The user interface 210 also comprises a control object 225 whereby one or more light settings of the selected light source 105 can be adjusted. In this embodiment the control object comprises a slider 230, which the user can 'drag' in order to indicate a desired light setting. In FIG. 2, the position of the slider 230 represents the current light intensity of the selected light source 105, and can be dragged towards "Lo" or towards "Hi" to dim or brighten the light source 105 respectively.

Thus a user can place the portable controller 110 on his desk 130 and then via the user interface 210 he can select and adjust, as desired, the light settings of the light sources 105 which cast light on the desk 130. The user is presented with this functionality automatically.

The portable controller 110, and the way it works in order to control the light sources 105, will now be described in more detail with reference to FIGS. 3 to 5.

Figure 3:
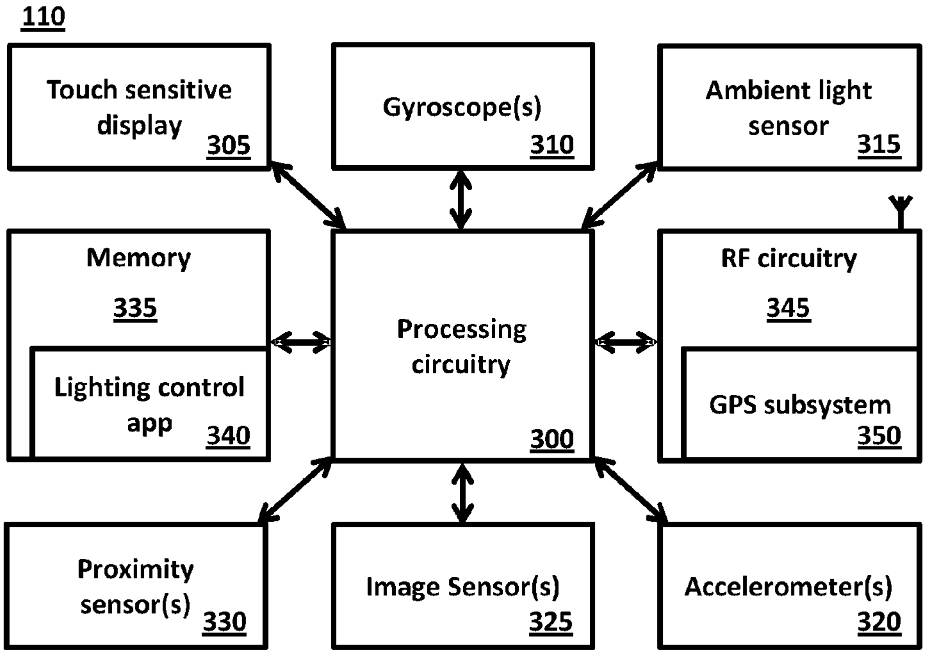
FIG. 3 schematically shows some of the components of the handheld computing device of FIG. 1 and their interconnections, including a memory having lighting control 'app' stored therein.

As shown in FIG. 3, the portable controller 110 comprises processing circuitry 300 which is communicatively coupled to a touch-sensitive display 305 and to a plurality of sensors. The plurality of sensors comprises: one or more gyroscopes 310; one or more ambient light sensors 315; one or more accelerometers 320, including a three-axis accelerometer in this embodiment; one or more magnetometers (not shown); one or more image sensors 325, which includes an integrated camera in this embodiment; and one or more proximity sensors 330.

The processing circuitry 300 is also communicatively coupled to memory 335 which comprises, in addition to a number of conventional files and applications, a lighting control application 340 (hereinafter, the 'app 340'). When executed by the processing circuitry 300, the app 340 causes the portable controller 110 to carry out a method of controlling one or more of the light sources 105. The method was discussed above in outline and is shown in more detail in FIG. 4, and in this embodiment it includes generating the user interface 210 shown in FIG. 2.

The processing circuitry 300 is also communicatively coupled to radiofrequency ('RF') circuitry 345, which is suitable for wireless communication and includes a GPS subsystem 350.

Figure 5:
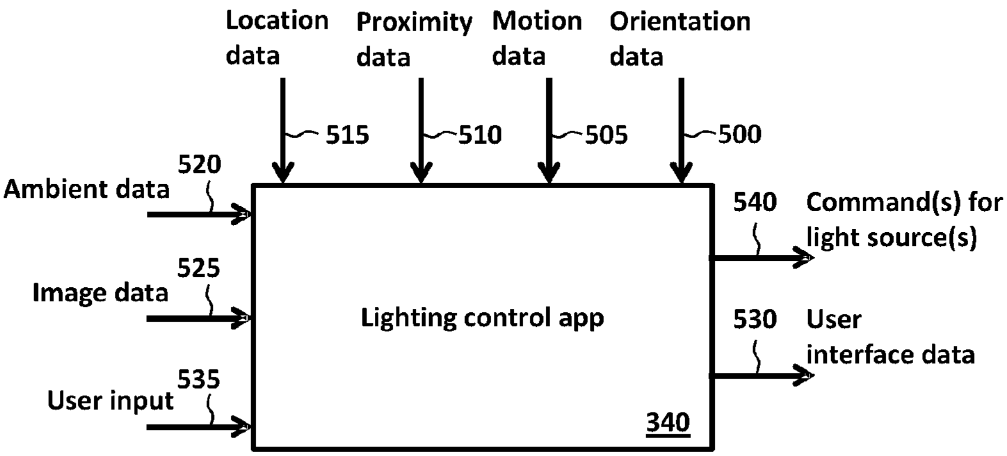
FIG. 5 schematically shows various possible inputs and outputs of the app, e.g. when carrying out the steps shown in FIG. 4.
Figure 4:
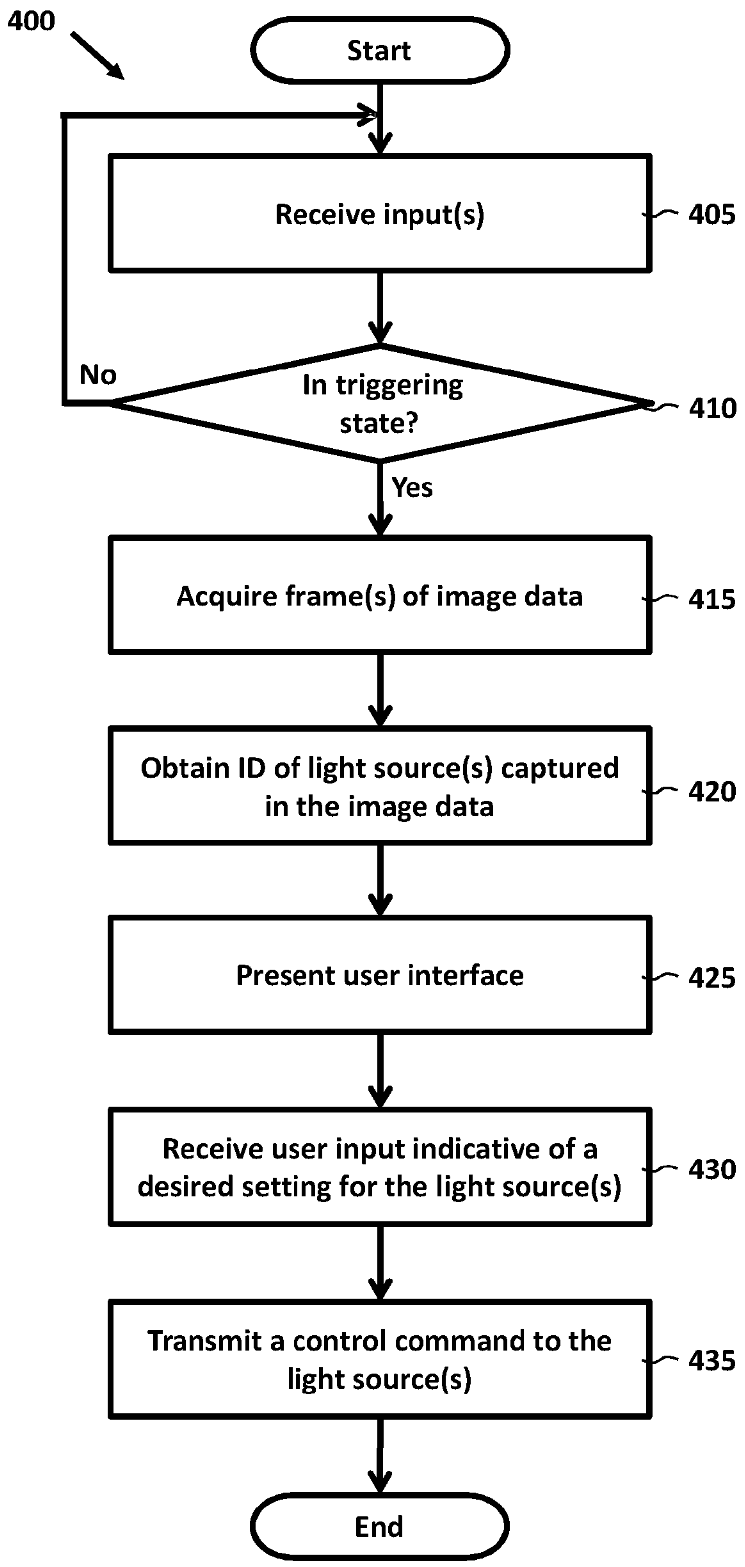
FIG. 4 is a flow diagram illustrating steps carried out when the lighting control 'app' shown in FIG. 3 is executed, in order to control one or more of the light sources shown in FIG. 1.

Referring now to FIGS. 4 and 5, the processing circuitry 300 receives 405 one or more inputs in the form of data from one or more of the sensors 310, 315, 320, 325, 330. In this embodiment, the processing circuitry 300 receives 405 an input comprising orientation data 500 produced by the gyroscope(s) 310 and/or the accelerometer(s) 320 and/or the magnetometer(s), and an additional input comprising motion data 505 produced by the accelerometer(s) 320. As shown in FIG. 5, the input could also comprise: proximity data 510 produced by the proximity sensor(s) 330; ambient data 520 produced by the ambient light sensor(s) 315; and/or location data 515 from the RF circuitry 345, which may comprise GPS location data and WiFi-based location data.

Next, the processing circuitry 300 determines 410 a current state of the portable controller 110 based at least in part on the received input and the received additional input. In particular it determines 410 whether or not the portable controller 110 is in a predefined triggering state. In this embodiment, the portable controller 110 is in the predefined triggering state if it is generally horizontal and substantially motionless, which it can determine 410 from the orientation data 500 and the motion data 505 received in the first and additional inputs. In this embodiment, the portable controller 110 is considered to be 'substantially motionless' if the motion data 505 represents a value no greater than a threshold value. A suitable value for the threshold can be predetermined via calibration, either by the user, or by a factory preset made available by the app developer. If the processing circuitry 300 determines 410 that the portable controller 110 is not in the predefined triggering state, it continues to evaluate the inputs it receives.

Next, if the processing circuitry 300 determines 410 that the portable controller 110 is in the predefined triggering state, in response it proceeds to acquire 415 one or more frames of image data 525 via the integrated camera. In this embodiment, it acquires 415 the image data 525 such that variations over time in the light 125 emitted by the light sources 105 are captured in the image data 525. In this embodiment, the image sensor(s) 325 comprise an integrated 'rolling shutter' camera, i.e. an integrated camera in which the start of the exposure of a line of the image data 525 is delayed with respect to the start of the exposure of a previous line of the image data 525. These delays cause different lines of the image data 525 to represent the light 125 at a different point in time. As a result, each frame of image data 525 will comprise respective patterns caused by intensity variations, during capture of the frame, in the light 125 emitted by each of the light sources 105. Each pattern generally resembles a plurality of vertically-spaced horizontal stripes, each brighter or darker than the one above/below. The skilled person will appreciate many suitable combinations of modulation scheme for the light 125, and exposure time, line rate and frame rate of the rolling shutter camera 325, so they need not be described in detail here. More information is available from the applicant's co-pending patent application, international patent application number PCT/IB2012/051370.

Next, the processing circuitry 300 determines 420, from the image data 525, respective identifiers of the light sources 105. There are numerous methods of doing so. In this embodiment, information is derivable from the image data 525, by evaluating the differences in intensity between adjacent 'stripes', their dimensions and their spacing. In this regard each of the patterns is different, and corresponds to a respective one of the IP addresses encoded into the light 125. The processing circuitry 300 is configured to decode the patterns into the corresponding IP addresses. The skilled person will appreciate various conventional image processing techniques that are suitable for analyzing the image data 525 to derive therefrom identifiers of the light sources 105, so they need not be described in detail here. More information is available from the applicant's co-pending patent application, international patent application number PCT/IB2012/051370.

Next, the processing circuitry 300 generates user-interface data 530 suitable for presenting 425 the user interface 210 on the display 200. The user interface 210 may present a frame (or part of a frame) of the acquired image data 525 as a background image on the display 200, to more clearly show the user which light sources 105 can be controlled. As shown in FIG. 2, the user interface 210 invites the user to provide an input for adjusting a setting of one or more of the light sources 105.

Next, the processing circuitry 300 receives 430 a user input 535 indicative of the user's desired light settings. The user input 535 includes an identification of which of the light sources 105 is to be controlled, as well as an indication of the desired light settings. The desired light settings include inter alia a desired intensity and a desired color temperature, and could for example specify various lighting effects via full RGB control.

Next, the processing circuitry 300 transmits 435 one or more commands 540 to the light sources 105 via the wireless channel 135 and the WAP 115. The commands 540 comprise an identification of which of the light sources 105 is being addressed, as well as an indication of the desired light settings as received from the user via the user input 535.

While an embodiment of the invention has been illustrated and described in detail in the drawings and foregoing description, such illustration and description are to be considered illustrative and not restrictive; the invention is not limited to the disclosed embodiments.

For example, it is possible to operate the invention in an embodiment wherein, instead of presenting 425 the user interface 210 and receiving 430 the user input(s) 535 for varying a setting of the light sources 105, the processing circuitry transmits to the light sources 105 a control command indicative of predefined 'favorite' light settings of the user. This need not require any input from the user, and the portable controller need not provide any indication to the user that the command has been sent. The predefined light settings may be retrieved from memory, or received from another device e.g. a server.

In an embodiment, instead of obtaining an identifier of a light source directly from the light it emits, as described above, the identifier may be obtained via conventional device discovery methods e.g. using Zigbee, Bluetooth, WiFi or the like. In such an embodiment, it may be determined that the one or more frames of image data comprise image data representative of one or more light sources, e.g. by perceiving one or more high-intensity regions of the image data, which may cause initiation of one or more discovery methods to obtain an identifier of the or each light source.

The handheld computing device 110 described herein, and referred to above as the portable controller 110 for convenience, could be a smart phone or other portable wireless communication device. It could be a tablet computer. These types of devices tend to include, 'out of the box', suitable sensors such as gyroscopes, compasses, accelerometers, magnetometers, ambient light sensors and proximity sensors. They also tend to have integrated cameras; some have integrated 'front' and 'rear' cameras. However, an alternative embodiment comprises a handheld computing device that is operably connected to a camera which is attachable to the device, but is not an integrated camera.

Herein a light source may comprise any suitable source of light, such as a high- or a low-pressure gas discharge source, a laser diode, an organic light emitting diode, an inorganic light emitting diode, an incandescent source, or a halogen source.

In the foregoing description, one or more commands 540 are said to be transmitted via a wireless channel to a WiFi wireless access point 115, which in another embodiment could be replaced by (or supplemented with a Zigbee bridge). In an embodiment, the one or more commands are transmitted to the light source directly, e.g. via Bluetooth. In an embodiment, the portable controller can be 'docked' via a docking station, and is arranged to transmit the one or more commands to the light source via a wired connection of the docking station.

Also, there are alternative triggering states which may provide some advantages. In an embodiment, the additional input (comprising motion data 505) is ignored or not received, and the triggering state is simply that the portable controller is 'generally horizontal' (as per the definition above) or in any other predefined triggering orientation. In an embodiment, there are multiple triggering orientations; in general an orientation can be a triggering orientation if, when the portable controller is in that orientation, the camera connected to the portable controller can 'see' the light sources above it. Thus in an embodiment a user can place the portable controller on a work surface which is not horizontal whereby it will be in a predefined triggering orientation. The portable controller would automatically determine that it is in that predefined triggering orientation, and in response would automatically attempt to establish a controlling connection with one or more light sources which are within the field of view of the camera. When the portable controller is not horizontal, a light source directly above it will not appear in the center of the one or more frames of image data captured via the camera. It will appear offset from center in a direction and by an amount dependent on the direction and angle of inclination of the portable controller, respectively. However, in an embodiment, the portable controller is configured to compensate for this offset, based on its determination of its current orientation.

In an embodiment, the portable controller is configured to infer whether or not it is motionless from consecutive inputs indicative of orientation. For instance, the portable controller might receive, per second, 30 inputs indicative of the portable controller's orientation; if 15 consecutive inputs indicate that the portable controller is horizontal +/− (say) 5 degrees, the portable controller can infer that it is substantially motionless.

In an embodiment, the processing circuitry receives a further input comprising location data e.g. GPS location data and/or WiFi-based location data. The location data may be determined by the RF circuitry, e.g. by the GPS subsystem, or it may be determined elsewhere in the lighting system and forwarded to the processing circuitry. The processing circuitry is arranged to determine from the further input that the portable controller is in a predefined location. The predefined location may be defined in terms of GPS coordinates and/or in terms of being in range of wireless access points; other suitable ways to define it will be readily appreciated by those skilled in the art. The predefined location may be stored in the memory of the portable controller, or in a location otherwise accessible by the portable controller e.g. via a connection to a network device on which it is stored. Accordingly, the user is able to define the locations in which the portable controller should, or should not, automatically attempt to establish a controlling connection with one or more light sources which are currently illuminating it.

In an embodiment, the processing circuitry is arranged to determine, based at least in part on the input (comprising orientation data), the direction in which it is facing. Thus, in a generally horizontal orientation, it can determine whether the portable controller is front-side up, or front-side down, and therefore whether the camera is pointing generally upwards or generally downwards. Thus it can disable a downward-facing camera, and enable an upward-facing camera.

In an embodiment, the processing circuitry receives from the ambient light sensor(s) a further input comprising ambient data. The processing circuitry is arranged to determine, based at least in part on the further input (indicative of ambient light), whether ambient light intensity is above a threshold. The processing circuitry is arranged to acquire the frame(s) of image data only of ambient light intensity is above the threshold. Thus, the portable device will not attempt to identify controllable light sources when the ambient light intensity is so low as to indicate that there are no light sources in the vicinity.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single processor or other unit may fulfill the functions of several items recited in the claims. The mere fact that certain measures are recited in mutually different dependent claims does not indicate that a combination of these measures cannot be used to advantage.

A computer program such as the lighting control app 340 may be stored/distributed on a suitable computer readable medium, such as an optical storage medium or a solid-state medium supplied together with or as part of other hardware, but may also be distributed via other computer program products such as Internet/intranet downloads or via other wired or wireless telecommunication systems.

Any reference signs in the claims should not be construed as limiting the scope.

The invention claimed is:

1. A method of controlling a light source via a handheld computing device, the method comprising:

receiving an input produced by one or more sensors of the handheld computing device, the input being indicative of a current orientation of the handheld computing device;

in response to determining, based at least in part on the input, that the handheld computing device is in a predefined triggering orientation, acquiring one or more frames of image data via an image sensor connected to the handheld computing device, determining that the one or more frames of image data comprise image data representative of the light source, and obtaining an identifier of the light source; and transmitting to the light source a command indicative of a desired light setting for the light source.

2. The method of claim 1, wherein said acquiring one or more frames of image data comprises capturing in the image data one or more variations in light emitted by the light source, and wherein said obtaining an identifier of the light source comprises obtaining the identifier from the one or more variations captured in the image data.

3. The method of claim 1, wherein the desired light setting comprises a predefined light setting associated with the handheld computing device, and the method further comprises receiving the predefined light setting for transmitting to the light source.

4. The method of claim 1, comprising:

presenting a user interface on a display of the handheld computing device, for enabling a user to choose a desired light setting for the light source;

receiving via an input device of the handheld computing device, an indication of a desired light setting for the light source; and transmitting to the light source a command indicative of the user-indicated desired light setting.

5. The method of claim 4 wherein the user interface comprises at least part of one the acquired frame(s) of image data.

6. The method of claim 1, further comprising:

receiving an additional input produced by one or more sensors of the handheld computing device, the additional input being indicative of current motion of the device; and in response to determining, based at least in part on the input and the additional input, that the handheld computing device is in the predefined triggering orientation and that the current motion thereof is below a predefined threshold, acquiring said one or more frames of image data via the image sensor.

7. The method of claim 1 further comprising:

receiving a further input, which is indicative of a current location of the handheld computing device; and in response to determining, based at least in part on the input and the further input, that the handheld computing device is in the predefined triggering orientation and is in a predefined location, acquiring said one or more frames of image data via the image sensor.

8. The method of claim 1, further comprising:

in response to determining, based at least in part on the input, that the handheld computing device is in the predefined triggering orientation and that the image sensor is facing upwards, acquiring said one or more frames of image data via the image sensor.

9. The method of claim 1, wherein the predefined triggering orientation is a generally horizontal orientation.

10. A computer program product comprising a computer program which, when executed by suitably arranged processing circuitry of a handheld computing device, causes the handheld computing device to carry out the method of claim 1.

11. A handheld computing device comprising:

a display;

one or more sensors;

a camera comprising an image sensor;

communication circuitry for communicating with a light source;

memory comprising a computer program stored therein; and processing circuitry connected to the display, the one or more sensors, the image sensor, the communication circuitry and the memory, which by executing the computer program is arranged to carry out the steps of:

receiving an input produced by the one or more sensors of the handheld computing device, the input being indicative of a current orientation of the handheld computing device;

in response to determining, based at least in part on the input, that the handheld computing device is in a predefined triggering orientation, acquiring one or more frames of image data via an image sensor connected to the handheld computing device, determining that the one or more frames of image data comprise image data representative of the light source, and obtaining an identifier of the light source; and transmitting to the light source a command indicative of a desired light setting for the light source.

12. The handheld computing device of claim 11 wherein the display is a touch-sensitive display.

13. The handheld computing device of claim 11 wherein the one or more sensors comprises at least one of the following: one or more gyroscopes; one or more ambient light sensors; one or more accelerometers; one or more magnetometers; and one or more proximity sensors.

14. The handheld computing device of claim 11, embodied in a smartphone or a tablet computer.

15. A lighting system comprising:

at least one controllable light source, which optionally is suitable for encoding an identifier thereof into its emitted light; and at least one handheld computing device operable to control said at least one controllable light source, the device comprising:

a display;

one or more sensors;

a camera comprising an image sensor;

communication circuitry for communicating with a light source;

memory comprising a computer program stored therein; and processing circuitry connected to the display, the one or more sensors, the image sensor, the communication circuitry and the memory, which by executing the computer program is arranged to carry out the steps of:

receiving an input produced by the one or more sensors of the handheld computing device, the input being indicative of a current orientation of the handheld computing device;

in response to determining, based at least in part on the input, that the handheld computing device is in a predefined triggering orientation, acquiring one or more frames of image data via an image sensor connected to the handheld computing device, determining that the one or more frames of image data comprise image data representative of the light source, and obtaining an identifier of the light source; and transmitting to the light source a command indicative of a desired light setting for the light source.

* * * * *